(12) United States Patent
Karnik et al.

(10) Patent No.: US 9,275,799 B2
(45) Date of Patent: Mar. 1, 2016

(54) WET ELECTROLYTIC CAPACITOR CONTAINING AN IMPROVED ANODE

(71) Applicant: AVX Corporation, Fountain Inn, SC (US)

(72) Inventors: Tomas Karnik, Lanskroun (CZ); Jan Petrzilek, Usti nad Orlici (CZ); Martin Biler, Novy Jicin (CZ)

(73) Assignee: AVX Corporation, Fountain Inn, SC (US)

( * ) Notice: Subject to any disclaimer, the term of this patent is extended or adjusted under 35 U.S.C. 154(b) by 482 days.

(21) Appl. No.: 13/710,515

(22) Filed: Dec. 11, 2012

(65) Prior Publication Data

US 2013/0155580 A1 Jun. 20, 2013

Related U.S. Application Data

(60) Provisional application No. 61/577,830, filed on Dec. 20, 2011.

(51) Int. Cl.
*H01G 9/052* (2006.01)
*H01G 9/00* (2006.01)
*H01G 9/145* (2006.01)
*H01G 9/048* (2006.01)

(52) U.S. Cl.
CPC ........... *H01G 9/0525* (2013.01); *H01G 9/0029* (2013.01); *H01G 9/048* (2013.01); *H01G 9/052* (2013.01); *H01G 9/145* (2013.01); *Y10T 29/417* (2015.01)

(58) Field of Classification Search
CPC ... H01G 9/0525; H01G 9/0029; H01G 9/052; H01G 9/048
USPC ........................................................ 361/508
See application file for complete search history.

(56) References Cited

U.S. PATENT DOCUMENTS

| 2,042,283 | A |   | 5/1936  | Van Arkel et al. |
|-----------|---|---|---------|------------------|
| 3,345,545 | A | * | 10/1967 | Bourgault et al. ............ 361/529 |
| 5,111,327 | A |   | 5/1992  | Blohm et al. |
| 5,369,547 | A |   | 11/1994 | Evans |
| 5,457,862 | A |   | 10/1995 | Sakata et al. |

(Continued)

FOREIGN PATENT DOCUMENTS

| GB | 395842 | 7/1933 |
| GB | 503460 | 4/1939 |

(Continued)

OTHER PUBLICATIONS

Abstract of Japanese Patent—JP2007311531, Nov. 29, 2007, 1 page.

(Continued)

*Primary Examiner* — Jenny L Wagner
*Assistant Examiner* — Michael P McFadden
(74) *Attorney, Agent, or Firm* — Dority & Manning, P.A.

(57) ABSTRACT

A wet electrolytic capacitor that includes a sintered porous anode body containing a dielectric layer, a fluid electrolyte, and a cathode is provided. At least one longitudinally extending channel is recessed into the anode body. The channel may have a relatively high aspect ratio (length divided by width), such as about 2 or more, in some embodiments about 5 or more, in some embodiments from about 10 to about 200, in some embodiments from about 15 to about 150, in some embodiments from about 20 to about 100, and in some embodiments, from about 30 to about 60.

32 Claims, 4 Drawing Sheets

(56) References Cited

U.S. PATENT DOCUMENTS

| | | | |
|---|---|---|---|
| 5,473,503 A | 12/1995 | Sakata et al. | |
| 5,716,511 A | 2/1998 | Melody et al. | |
| 5,729,428 A | 3/1998 | Sakata et al. | |
| 5,808,857 A | 9/1998 | Stevens | |
| 5,812,367 A | 9/1998 | Kudoh et al. | |
| 5,922,215 A | 7/1999 | Pless et al. | |
| 5,930,109 A | 7/1999 | Fishler | |
| 5,949,639 A * | 9/1999 | Maeda et al. | 361/523 |
| 5,968,210 A | 10/1999 | Strange et al. | |
| 5,983,472 A | 11/1999 | Fayram et al. | |
| 6,042,740 A | 3/2000 | Uehara et al. | |
| 6,094,339 A | 7/2000 | Evans | |
| 6,162,345 A | 12/2000 | Kinard et al. | |
| 6,191,936 B1 | 2/2001 | Webber et al. | |
| 6,197,252 B1 | 3/2001 | Bishop et al. | |
| 6,231,993 B1 | 5/2001 | Stephenson et al. | |
| 6,238,810 B1 | 5/2001 | Strange et al. | |
| 6,246,569 B1 | 6/2001 | Strange et al. | |
| 6,249,423 B1 | 6/2001 | O'Phelan et al. | |
| 6,261,434 B1 | 7/2001 | Melody et al. | |
| 6,267,861 B1 | 7/2001 | Kinard et al. | |
| 6,322,912 B1 | 11/2001 | Fife | |
| 6,346,185 B1 | 2/2002 | Kinard et al. | |
| 6,377,442 B1 | 4/2002 | Strange et al. | |
| 6,391,275 B1 | 5/2002 | Fife | |
| 6,416,730 B1 | 7/2002 | Fife | |
| 6,421,226 B1 | 7/2002 | O'Phelan et al. | |
| 6,426,864 B1 | 7/2002 | O'Phelan et al. | |
| 6,527,937 B2 | 3/2003 | Fife | |
| 6,556,863 B1 | 4/2003 | O'Phelan et al. | |
| 6,576,009 B2 | 6/2003 | Ryan et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,659,283 B1 | 12/2003 | Muffoletto et al. | |
| 6,802,951 B2 | 10/2004 | Hossick-Schott | |
| 6,802,954 B1 | 10/2004 | Hemphill et al. | |
| 6,815,306 B1 | 11/2004 | Strange et al. | |
| 6,850,405 B1 | 2/2005 | Mileham et al. | |
| 6,858,126 B1 | 2/2005 | Hemphhill et al. | |
| 6,954,140 B2 | 10/2005 | Holler | |
| 6,965,510 B1 | 11/2005 | Liu et al. | |
| 6,987,663 B2 | 1/2006 | Merker et al. | |
| 7,043,300 B2 | 5/2006 | O'Phelan et al. | |
| 7,090,762 B2 | 8/2006 | Tripp et al. | |
| 7,116,548 B2 | 10/2006 | Satterfield, Jr. et al. | |
| 7,150,767 B1 | 12/2006 | Schneider et al. | |
| 7,154,742 B1 | 12/2006 | Hahn et al. | |
| 7,196,899 B1 | 3/2007 | Feger et al. | |
| 7,207,103 B2 | 4/2007 | Poltorak | |
| 7,220,397 B2 | 5/2007 | Kimmel et al. | |
| 7,244,279 B2 | 7/2007 | Seitz et al. | |
| 7,248,462 B2 | 7/2007 | Melody et al. | |
| 7,286,336 B2 | 10/2007 | Liu et al. | |
| 7,341,705 B2 | 3/2008 | Schnitter | |
| 7,342,774 B2 | 3/2008 | Hossick-Schott et al. | |
| 7,342,775 B2 * | 3/2008 | Hahn et al. | 361/528 |
| 7,381,396 B2 | 6/2008 | Thomas et al. | |
| 7,385,802 B1 | 6/2008 | Ribble et al. | |
| 7,419,926 B2 | 9/2008 | Schnitter et al. | |
| 7,445,646 B1 | 11/2008 | Strange et al. | |
| 7,515,396 B2 | 4/2009 | Biler | |
| 7,531,010 B1 | 5/2009 | Feger et al. | |
| 7,544,218 B2 | 6/2009 | Norton et al. | |
| 7,558,051 B2 | 7/2009 | O'Phelan et al. | |
| 7,658,986 B2 | 2/2010 | Poltorak et al. | |
| 7,678,259 B2 | 3/2010 | Melody et al. | |
| 7,684,171 B2 | 3/2010 | Rorvick et al. | |
| 7,715,174 B1 | 5/2010 | Beauvais et al. | |
| 7,727,372 B2 | 6/2010 | Liu et al. | |
| 7,731,893 B2 | 6/2010 | Freeman et al. | |
| 7,837,743 B2 | 11/2010 | Gaffney et al. | |
| 7,879,217 B2 | 2/2011 | Goad et al. | |
| 8,279,585 B2 | 10/2012 | Dreissig et al. | |
| 2004/0243183 A1 | 12/2004 | Norton et al. | |
| 2006/0091020 A1 | 5/2006 | Hossick-Schott et al. | |
| 2006/0191796 A1 | 8/2006 | Muffoletto et al. | |
| 2007/0221507 A1 | 9/2007 | Liu et al. | |
| 2008/0007894 A1 | 1/2008 | Seitz et al. | |
| 2008/0013257 A1 | 1/2008 | Seitz et al. | |
| 2009/0273885 A1 | 11/2009 | Jiang et al. | |
| 2010/0065529 A1 | 3/2010 | Ribble | |
| 2010/0142124 A1 * | 6/2010 | Dreissig et al. | 361/516 |
| 2010/0155645 A1 | 6/2010 | Liu et al. | |
| 2010/0265634 A1 * | 10/2010 | Freeman et al. | 361/529 |
| 2010/0302709 A1 * | 12/2010 | Dreissig | H01G 9/035 361/505 |
| 2010/0318140 A1 | 12/2010 | Hintz et al. | |
| 2012/0003852 A1 * | 1/2012 | Chang | 439/83 |

FOREIGN PATENT DOCUMENTS

| | | |
|---|---|---|
| GB | 1076460 | 10/1965 |
| GB | 2077997 A | 12/1981 |
| JP | 10233347 A | 9/1998 |
| JP | 2001217160 A | 8/2001 |
| JP | 2007081259 A | 3/2007 |

OTHER PUBLICATIONS

Preliminary Search Report and Written Opinion from France for French Patent Application No. 12 03438, 10 pages.

Freeman, et al. "Reliability and Critical Applications of Tantalum Capacitors," CARTS Europe 2007 Symposium, Oct.-Nov. 2007, Barcelona, Spain, pp. 193-204.

Search Report for GB1222270.9 dated Apr. 30, 2013, 4 pages.

* cited by examiner

WET ELECTROLYTIC CAPACITOR CONTAINING AN IMPROVED ANODE

RELATED APPLICATIONS

The present application claims priority to U.S. Provisional Application Ser. No. 61/577,830, filed on Dec. 20, 2011, which is incorporated herein in its entirety by reference thereto.

BACKGROUND OF THE INVENTION

Wet tantalum capacitors are increasingly being used in the design of circuits due to their volumetric efficiency, reliability, and process compatibility. Such capacitors typically have a larger capacitance per unit volume than certain other types of capacitors, making them valuable in high-current, high power and low-frequency electrical circuits. Also, the unit cell voltage in this type of capacitor is generally higher due to the formation of a dielectric metal oxide film over the anode surface. Thus, wet tantalum capacitors are often used in applications where high capacitance, high voltages, good reliability, and a long operation life are needed, such as medical, industrial, defense, aerospace, drilling, etc. More particularly, in these applications, the wet tantalum capacitors are typically employed as filtering/coupling capacitors for DC/DC converter circuits. One problem with the conventional wet tantalum capacitors used in such circuits, however, is that they generally require a very large size (volume) to achieve a high level of capacitance and power output for the DC/DC converter circuit. Furthermore, attempts to reduce the size of such capacitors with an equivalent level of electrical performance have proven to be problematic.

As such, a need currently exists for a wet capacitor that is capable of exhibiting good volumetric efficiency, both in terms of its capacitance and its ability to help increase the power output of the circuit in which it is employed.

SUMMARY OF THE INVENTION

In accordance with one embodiment of the present invention, a wet electrolytic capacitor is disclosed that comprises an anode, a fluid electrolyte, and a cathode that contains a substrate. The anode contains a sintered porous anode body that extends in a longitudinal direction and is coated with a dielectric. The anode body contains a sidewall positioned between a proximal end and an opposing distal end, wherein a longitudinally extending channel is recessed into the sidewall.

In accordance with another embodiment of the present invention, a wet electrolytic capacitor is disclosed that comprises an anode, an aqueous fluid electrolyte, and a generally cylindrical metal casing within which the anode and the fluid electrolyte are positioned, wherein an electrochemically active material is disposed on an interior surface of the casing. The anode contains a generally cylindrical, sintered porous anode body having a sidewall positioned between a proximal end and an opposing distal end. The anode body is coated with a dielectric. A plurality of longitudinally extending channels are recessed into the sidewall of the anode body. The anode body contains tantalum, niobium, or an electrically conductive oxide thereof. The anode further comprises an anode lead wire that extends from the proximal end of the anode in the longitudinal direction.

In accordance with yet another embodiment of the present invention, a method for forming a wet electrolytic capacitor is disclosed that comprises pressing a powder into a porous anode body that extends in a longitudinal direction, wherein a longitudinally extending channel is recessed into the anode body; sintering the porous anode body; anodically oxidizing the sintered, anode body to form an anode; and placing the anode into electrical communication with a cathode and a fluid electrolyte.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
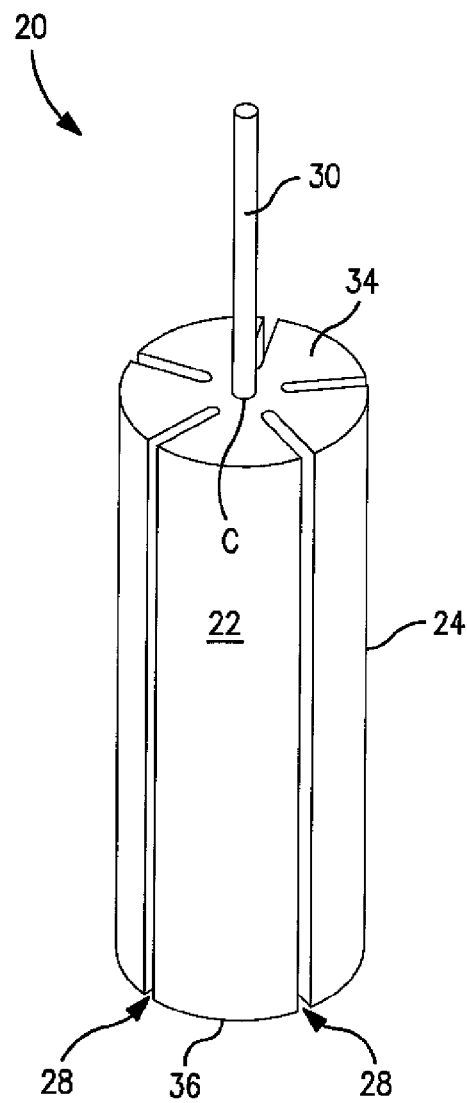
FIG. 1 is a perspective view of one embodiment of an anode that may be employed in the wet electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that includes a sintered porous anode body containing a dielectric layer, a fluid electrolyte, and a cathode. At least one longitudinally extending channel is recessed into the anode body. The channel may have a relatively high aspect ratio (length divided by width), such as about 2 or more, in some embodiments about 5 or more, in some embodiments from about 10 to about 200, in some embodiments from about 15 to about 150, in some embodiments from about 20 to about 100, and in some embodiments, from about 30 to about 60. Such channels can significantly increase the outer surface area of the anode, which may enhance the degree to which the anode can dissipate heat. Due to its thermal dissipation capacity, the resulting capacitor may exhibit a higher maximum ripple current (i.e., current required to raise the temperature of the capacitor by 10° C. at a frequency of 40 kHz) than previously found with conventional wet electrolytic capacitors. For example, the maximum ripple current may be about 2.5 Amps or more, in some embodiments, about 3.0 Amps or more, and in some embodiments, from about 3.2 Amps to about 5.0 Amps. Among other things, this may increase the power output of a DC/DC converter in which it is employed, or it may further reduce the size/weight of the capacitor required to achieve a certain predefined power output.

The increased available surface area of the anode can also increase the likelihood that the anodizing electrolyte will pass into the pores of the anode body during anodic oxidation. Due in part to such increased penetration efficiency; the present inventors have discovered that powders having a higher specific charge, and in turn smaller pores formed between the particles, can be effectively anodized. This allows higher capacitance values to be achieved in a package of the same size. The volumetric efficiency may, for example, range from about 10,000 $\mu F*V/cm^3$ to about 150,000 $\mu F*V/cm^3$, in some embodiments from about 15,000 $\mu F*V/cm^3$ to about 100,000 $\mu F*V/cm^3$, and in some embodiments, from about 20,000 $\mu F*V/cm^3$ to about 95,000 $\mu F*V/cm^3$. Volumetric efficiency is determined by multiplying the rated voltage of a part by its capacitance, and then dividing by the product by the volume of the part. For example, a rating may be 50 volts for a part having a capacitance of 1800 $\mu F$, which results in a product of 90,000 $\mu F*V$. If the part occupies a volume of about 2 $cm^3$, this results in a volumetric efficiency of about 45,000 $\mu F*V/cm^3$. The capacitance may, for example, be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 10 to about 40 $mF/cm^2$.

Alternatively, larger package sizes can be achieved with a higher dielectric quality, and thus the capacitor can exhibit an increased breakdown voltage (voltage at which the capacitor fails) for use in high voltage applications. The capacitor may, for example, exhibit a breakdown voltage of about 180 volts or more, in some embodiments about 200 volts or more, and in some embodiments, from about 210 volts to about 260 volts. Furthermore, the increased anode surface area may also enhance the degree of contact between the electrolyte and anode during use of the capacitor, which can result in other good electrical properties, such as a low equivalent series resistance ("ESR") or leakage current. The ESR may, for instance, be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the normalized leakage current may be less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

In addition to simply increasing available surface area, however, the present inventors have also unexpectedly discovered that the channels can provide a multitude of other benefits to the electrical performance of the capacitor. For instance, binders and/or lubricants are often incorporated into the anode body to facilitate pressing. Although such components may be removed through various heating and/or washing steps, some residual amount of carbon can nevertheless remain in the pressed body. This residual carbon can, however, lead to crystallization of the otherwise amorphous dielectric layer formed during anodic oxidation, which can damage the anode. Although this damage may not have an appreciable effect on all types of capacitors, the present inventors have discovered that it is particularly problematic for anodes used in wet electrolytic capacitors, which are typically large in size and/or formed from a powder having a high specific charge. Nevertheless, the present inventors have discovered that the channels of the present invention can help reduce carbon content and thus improve electrical performance. More specifically, it is believed that the channels can create a capillary pressure that helps overcome the adhesion forces of a washing liquid and the surface of the anode body, which further increases the degree to which the washing liquid, and in turn carbon, can be removed from the anode. The resulting anode may, for example, contain less than about 100 parts per million ("ppm") of carbon, in some embodiments less than about 50 ppm carbon, and in some embodiments, from 0 to 10 ppm carbon. The capillary pressure formed by the channels can also have other benefits. For example, the channels can allow the anodizing electrolyte to be more quickly removed upon completion of an anodization step, which enhances the rate of cooling and minimizes the formation of defects.

Various embodiments of the present invention will now be described in more detail.

I. Anode

The anode includes a sintered porous body that may be formed from a valve metal composition. The valve metal composition may contain a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). In certain cases, the powder may have a low specific charge to optimize the ability to grow a thick dielectric layer that is capable of withstanding high operational voltages. That is, the powder may have a specific charge of less than about 20,000 microFarads*Volts per gram ("$\mu F*V/g$"), in some embodiments about 1,000 $\mu F*V/g$ to about 20,000 $\mu F*V/g$, and in some embodiments, from about 2,000 to about 15,000 $\mu F*V/g$. However, as indicated above, the present inventors have discovered that powders having a relatively high specific charge can also be employed due to the increased outer surface area, and the ability for the anodizing electrolyte to penetrate into the smaller pores often associated with such powders. For example, such high specific charge powders may have a specific charge of from about 20,000 to about 450,000 µF*V/g, in some embodiments from about 30,000 to about 350,000 µF*V/g or more, in some embodiments from about 40,000 to about 300,000 µF*V/g, and in some embodiments, from about 50,000 to about 200,000 µF*V/g.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated, such as through one or multiple heat treatment steps in an inert or reducing atmosphere. The powder may also be subjected to various other optional techniques as is known in the art, such as milling, deoxidation, leaching, doping, etc.

As described above, the powder may also be mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methyl hydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using a powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. Although not required, the channels of the present invention may be formed during pressing as would be known to those skilled in the art. For example, the press mold may contain one or more longitudinal indentations that correspond to the desired shape of the channels. In this manner, the powder is compressed around the indentations so that when removed from the mold, the resulting anode body contains longitudinal channels at those areas where the longitudinal indentations were located in the mold.

After compaction, any binder/lubricant may be removed using a variety of different techniques. In certain embodiments, for example, the pellet is heated under vacuum pressure at a certain temperature (e.g., from about 150° C. to about 500° C.) for several minutes to drive off the binder/lubricant. The pellet may also be washed with a liquid solution (e.g., aqueous solution) to help assist in the removal of the binder/lubricant, such as described in U.S. Pat. No. 6,197,252 to Bishop, et al., which is incorporated herein in its entirety by reference thereto for all purposes. As indicated above, the channels of the present invention can create a capillary pressure that can help increase the degree to which the liquid solution, and in turn carbon, can be removed from the anode body.

Once formed, the anode body may then be sintered. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. When a high specific charge powder is employed to form the anode body, sintering can sometimes result in a substantial degree of shrinkage that results in physical deformation of the anode. To minimize such deformation, the sintering may be performed in such a manner that the surfaces of the anode body are not in physical contact with an external surface (e.g., surface of a sintering tray). For example, the anode may be connected via its anode lead (e.g., welded) to a stringer so that it hangs therefrom. Thus, as the anode is heated in the furnace, it is allowed to shrink freely without physical constraint.

Figure 2:
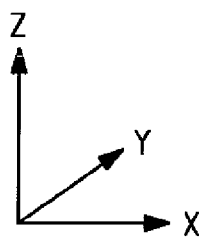
FIG. 2 is a side view of the anode of FIG. 1.
Figure 2:
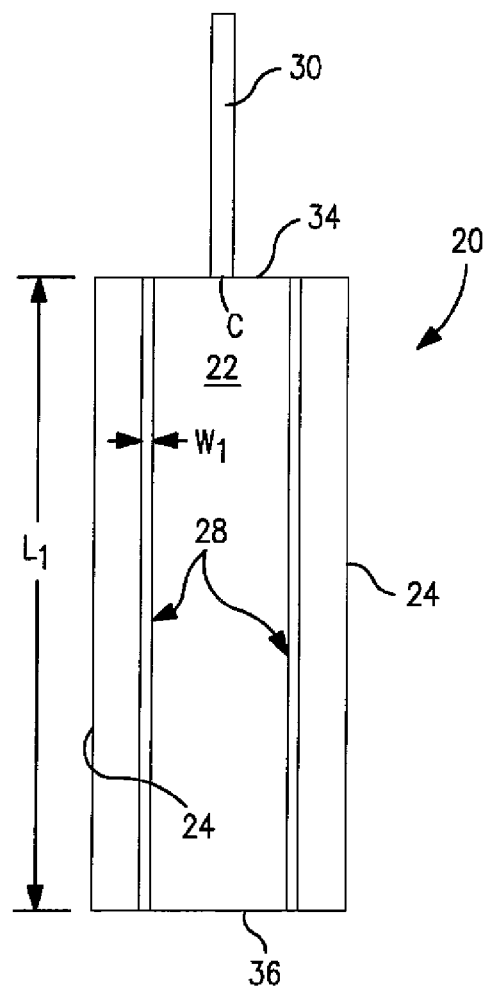
Figure 3:
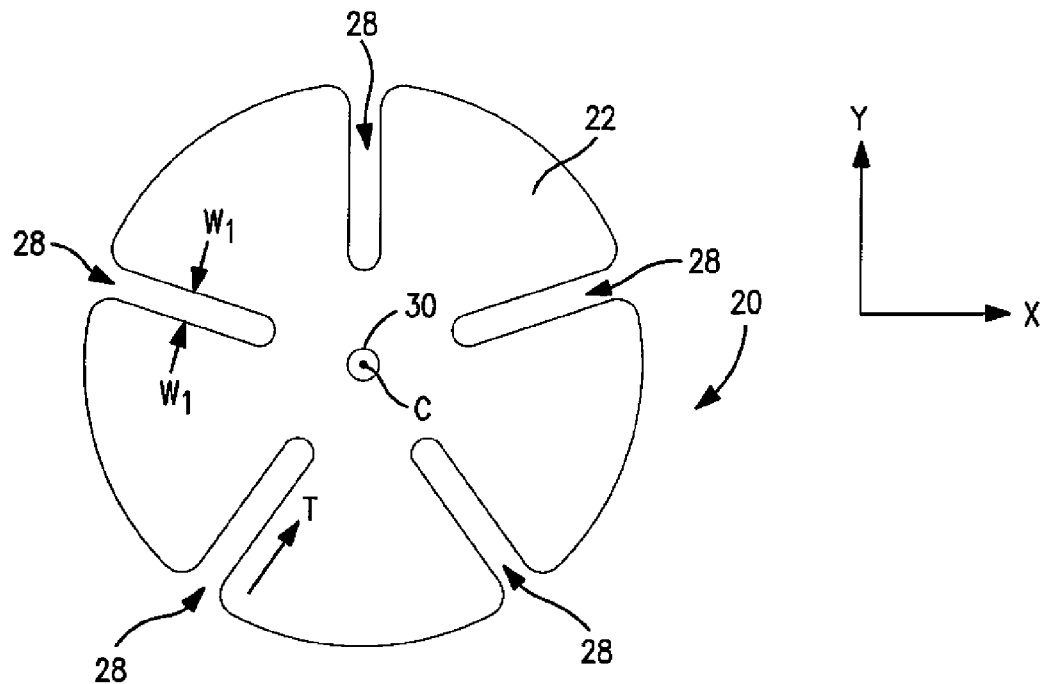
FIG. 3 is a top view of the anode of FIG. 1.

Upon sintering, an anode body is thus formed that contains longitudinal channels in accordance with the present invention. Referring to FIGS. 1-3, for example, one embodiment of an anode 20 is shown that contains a porous, sintered body 22 having at least one sidewall 24 positioned between a proximal end 34 and an opposing distal end 36. The cross-sectional shape of the proximal end 34 and/or the distal end 36 may generally vary based on the desired shape of the anode body 22. In this particular embodiment, for example, both ends 34 and 36 have a circular cross-sectional shape such that the anode body 22 is generally cylindrical. Other suitable shapes may include, for instance, square, rectangular, triangular, hexagonal, octagonal, heptagonal, pentagonal, trapezoidal, elliptical, star, sinusoidal, etc.

The anode body 22 also has a length in the longitudinal direction "z" defined between the ends 34 and 36, and a width in the "x" direction and depth in the "y" direction. In the illustrated embodiment, the width and depth are both defined between the sidewalls 24. Although by no means a requirement, the length of the anode body 22 is typically greater than its width and/or depth. For example, in certain embodiments, the ratio of the length to both the width and depth may be from about 1 to about 30, in some embodiments from about 1.1 to about 10, and in some embodiments, from about 1.5 to about 5. The length of the anode 20 may, for example, range from about 0.5 to about 100 millimeters, in some embodiments from about 1 to about 60 millimeters, and in some embodiments, from about 5 to about 30 millimeters. The width of the anode body 22 may range from about 0.5 to about 50 millimeters, in some embodiments from about 1 to about 40 millimeters, and in some embodiments, from about 4 to about 30 millimeters. Likewise, the depth of the anode body 22 may range from about 0.5 to about 50 millimeters, in some embodiments from about 1 to about 40 millimeters, and in some embodiments, from about 4 to about 30 millimeters. Of course, when the anode body is cylindrical in nature, its width and depth will be the same.

Regardless of its particular size or shape, the anode body 22 contains channels 28 that are recessed into the sidewall 24. The channels 28 are "longitudinally extending" in the sense that they possess a length in the longitudinal direction "z" of the anode body 22. However, while the channels 28 of FIGS. 1-3 are substantially parallel with the longitudinal direction, this is by no means a requirement. For example, other suitable embodiments may include one or more longitudinally extending channels that are in the form of a spiral, helix, etc., which are not parallel with the longitudinal of the anode body.

Figure 4:
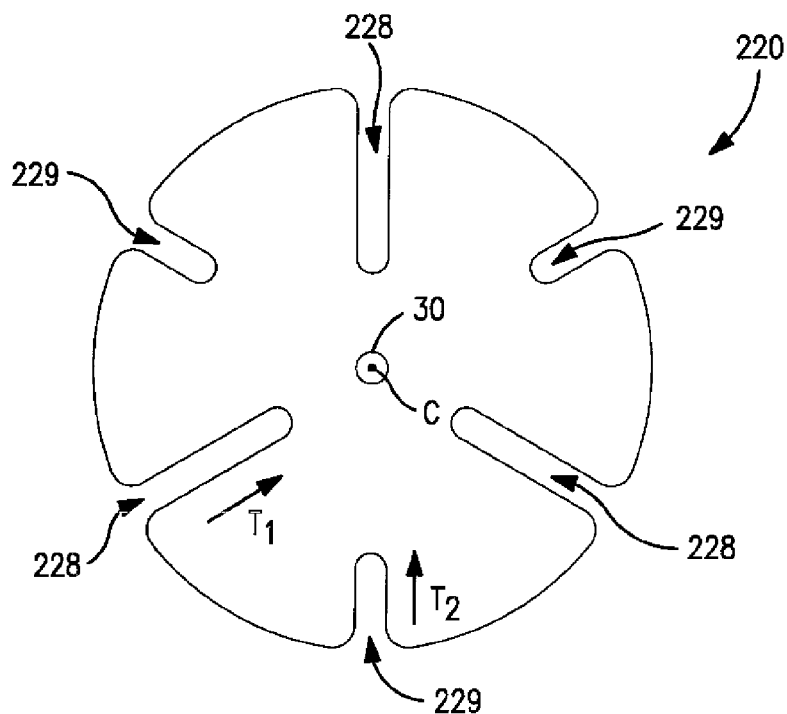
FIG. 4 is a top view of another embodiment of an anode that may be employed in the wet electrolytic capacitor of the present invention.

The number of such longitudinally extending channels may vary, but is typically from 1 to 20, in some embodiments from 2 to 15, and in some embodiments, from 4 to 10. When multiple channels are employed, it is generally desired that they are distributed symmetrically and equidistant about a center longitudinal axis of the anode, although this is by no means a requirement. In FIGS. 1-3, for example, the depicted anode body 22 contains five (5) separate channels 28. FIG. 4, on the other hand, shows an alternative embodiment in which six (6) separate channels 228 are employed. In each of the particular embodiments, however, the channels are distributed in a generally symmetric manner about the longitudinal center "C" of the anode body.

As indicated above, at least a portion of the channels 28 have a relatively high aspect ratio (length divided by width). The length "$L_1$" (FIG. 2) of the channels 28 may, for example, range from about 0.5 to about 100 millimeters, in some embodiments from about 1 to about 60 millimeters, and in some embodiments, from about 5 to about 30 millimeters. The width "$W_1$" of the channels 28 (FIGS. 2 and 3) may likewise range from about 0.01 to about 20 millimeters, in some embodiments from about 0.02 to about 15 millimeters, in some embodiments from about 0.05 to about 4 millimeters, and in some embodiments, from about 0.1 to about 2 millimeters.

Figure 6:
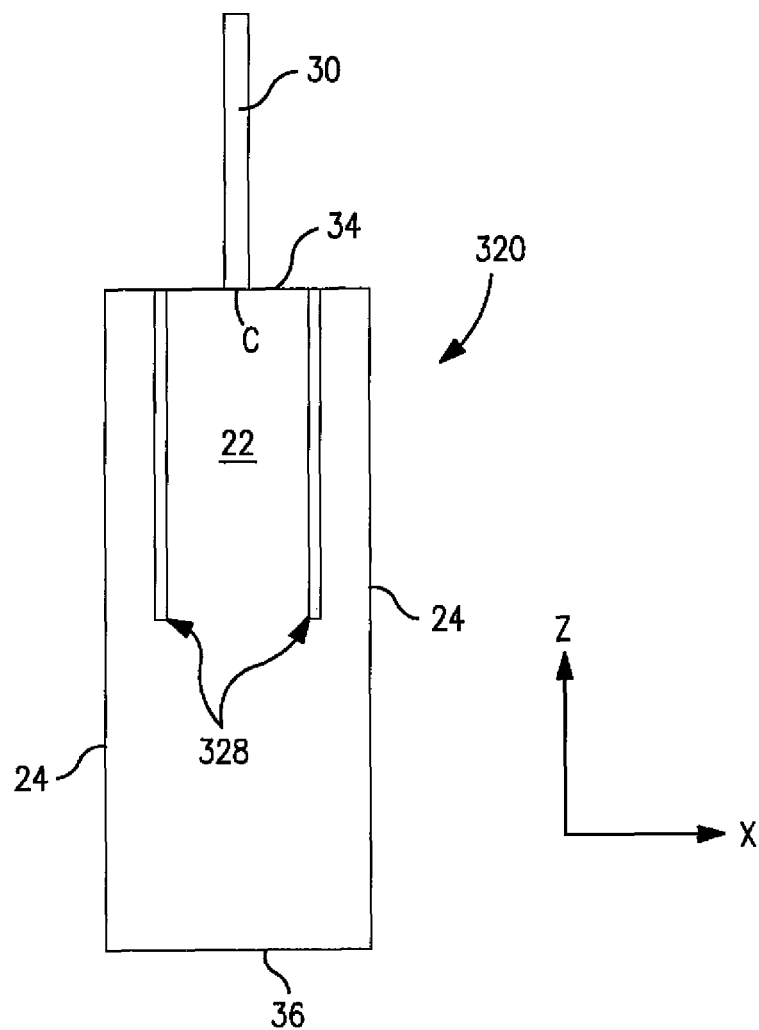
FIG. 6 is a side view of yet another embodiment of an anode that may be employed in the wet electrolytic capacitor of the present invention.

The channels 28 shown in FIGS. 1-3 extend in the longitudinal direction "L" along the entire length of the anode body 22 and intersect both the proximal end 34 and the distal end 36. It should be understood, however, that one or more channels may also extend along only a portion of the anode body length so that they intersect only one end of the anode body, or so that they do not intersect either end. Referring to FIG. 6, for instance, one embodiment of such an anode 320 is shown that contains a plurality of longitudinally extending channels 328 that are recessed into a sidewall 24, but do not intersect either a proximal end 34 or distal end 36 of the anode 320. Generally speaking, however, the ratio of the length of the anode body to the length of the channels in the longitudinal direction is from about 0.2 to 1, in some embodiments from about 0.5 to 1, and in some embodiments, from about 0.8 to 1. The ratio of the width of the anode body (e.g., diameter) to the width of the channels may also be within a range of from about 1 to about 100, in some embodiments from about 2 to about 40, and in some embodiments, from about 5 to about 30. In the embodiment shown in FIGS. 1-3, the cross-sectional width of the channels 28 is substantially constant and of a generally rectangular shape. Nevertheless, it should be understood that any other shape may also be employed, and that the width and/or shape of the channels may vary along the length of the channels if desired.

The extent to which the channels are recessed into the anode body may be selectively controlled in the present invention to achieve a balance between increased surface and integrity of the anode structure. That is, if the depth of the channels is too great, it may be difficult to press the anode into a physically strong structure. Likewise, if the depth is too small, the desired benefits may not be achieved. Thus, in most embodiments, the channels are recessed so that they extend in a direction that is from about 2% to about 60%, in some embodiments from about 5% to about 50%, and in some embodiments, from about 10% to about 45% of the thickness of the anode body in the same direction. Referring again to FIG. 3, for example, one of the channels 28 is shown as extending in a direction "T." in this embodiment, the length of the channel 28 in the direction "T" divided by the thickness of the porous body 22 in the direction "T", multiplied by 100, is within the percentages referenced above.

Of course, the depth of each of the channels need not be the same. Referring to FIG. 4, for example, one embodiment of an anode 220 is shown that contains first channels 228 and second channels 229. In this particular embodiment, the first channels 228 extend into the anode body to a greater degree than the second channels 229. One of the first channels 228 may, for example, extend in a direction "$T_1$" that is from about 15% to about 60%, in some embodiments from about 20% to about 50%, and in some embodiments, from about 25% to about 45% of the thickness of the anode body in the same direction. Likewise, one of the second channels 229 may extend in a direction "$T_2$" that is from about 2% to about 40%, in some embodiments from about 5% to about 35%, and in some embodiments, from about 10% to about 25% of the anode body in the same direction. Such a configuration can effectively combine the benefits of the deeper channels (e.g., greater surface area) with those of the shallower channels (e.g., greater physical integrity). In such embodiments, the number of deeper channels may be from 1 to 10, in some embodiments from 2 to 6, and in some embodiments, from 2 to 4, and the number of shallower channels may likewise be from 1 to 10, in some embodiments from 2 to 6, and in some embodiments, from 2 to 4.

Typically, the anode of the present invention also contains an anode lead wire that helps connect the anode to the terminations of the resulting capacitor. The lead wire may be formed from any electrically conductive material, such as tantalum, niobium, nickel, aluminum, hafnium, titanium, etc., as well as oxides and/or nitrides of thereof. Although not necessarily required, it is often desired that the lead wire extend in the same longitudinal direction as the channels. In the embodiment of FIGS. 1-3, for example, an anode lead wire 30 extends in the longitudinal "z" direction from the proximal end 34 of the anode body 22. Electrical contact with the anode 20 may be accomplished by in a variety of ways, such as by coupling the lead wire 30 using resistance or laser welding. Alternatively, the lead wire 30 may be embedded into the anode body during its formation (e.g., prior to sintering).

As indicated above, the channel-containing porous anode body may be anodically oxidized ("anodized") so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

II. Working Electrolyte

The working electrolyte is a fluid that may be impregnated within the anode, or it may be added to the capacitor at a later stage of production. The electrolyte is the material that provides the connecting path between the anode and cathode. Various suitable electrolytes are described in U.S. Pat. Nos. 5,369,547 and 6,594,140 to Evans, et al., which are incorporated herein their entirety by reference thereto for all purposes. Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The fluid electrolyte is generally in the form of a liquid, such as a solution (e.g., aqueous or non-aqueous), dispersion, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent (s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

III. Cathode

The cathode may be formed from a substrate that is optionally coated with an electrochemically active material. The substrate may be include a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc.

The substrate may be roughened to increase its surface area and increase the degree to which the electrochemically active material may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al., which is incorporated herein in its entirety by reference thereto for all purposes. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

The electrochemically-active material may be applied to the cathode substrate to inhibit corrosion and also act as a heat barrier when voltage is increased. Any of a variety of known electrochemically-active materials may generally be employed. One suitable material is a conductive polymer coating. The conductive polymer coating may be formed from one or more layers. The material employed in such layer(s) may vary. In one embodiment, for example, the material includes conductive polymer(s) that are typically π-conjugated and have electrical conductivity after oxidation or reduction, such as an electrical conductivity of at least about 1 µS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth.

Substituted polythiophenes are particularly suitable for use as the electrochemically active material in the present invention. Without intending to be limited by theory, it is believed that charging of the capacitor to a high voltage (e.g., greater than the formation voltage) forces ions of the electrolyte into coatings containing such substituted polythiophenes. This causes the conductive polymer to "swell" and retain the ions near the surface, thereby enhancing charge density. Because the polymer is generally amorphous and non-crystalline, it can also dissipate and/or absorb the heat associated with the high voltage. Upon discharge, it is also believed that the substituted polythiophene "relaxes" and allows ions in the electrolyte to move out of the coating. Through such swelling and relaxation mechanism, charge density near the metal substrate can be increased without a chemical reaction with the electrolyte. Accordingly, mechanical robustness and good electrical performance may be provided without the need for conventional conductive coatings, such as those made from activated carbon or metal oxides (e.g., ruthenium oxide). In fact, excellent results may be achieved using the coating as the principal material on the metal substrate. That is, the coating may constitute at least about 90 wt. %, in some embodiments at least about 92 wt. %, and in some embodiments, at least about 95 wt. % of the materials) present on the metal substrate. Nevertheless, it should be understood that other conductive coatings may also be used in some embodiments of the present invention.

In one particular embodiment, the substituted polythiophene has the following general structure:

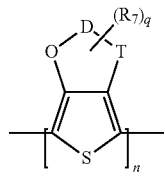

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

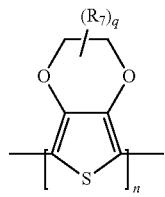

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

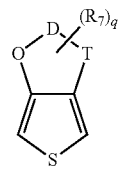

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

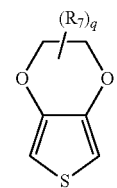

wherein, $R_7$ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the substrate may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the substrate. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

Figure 5:
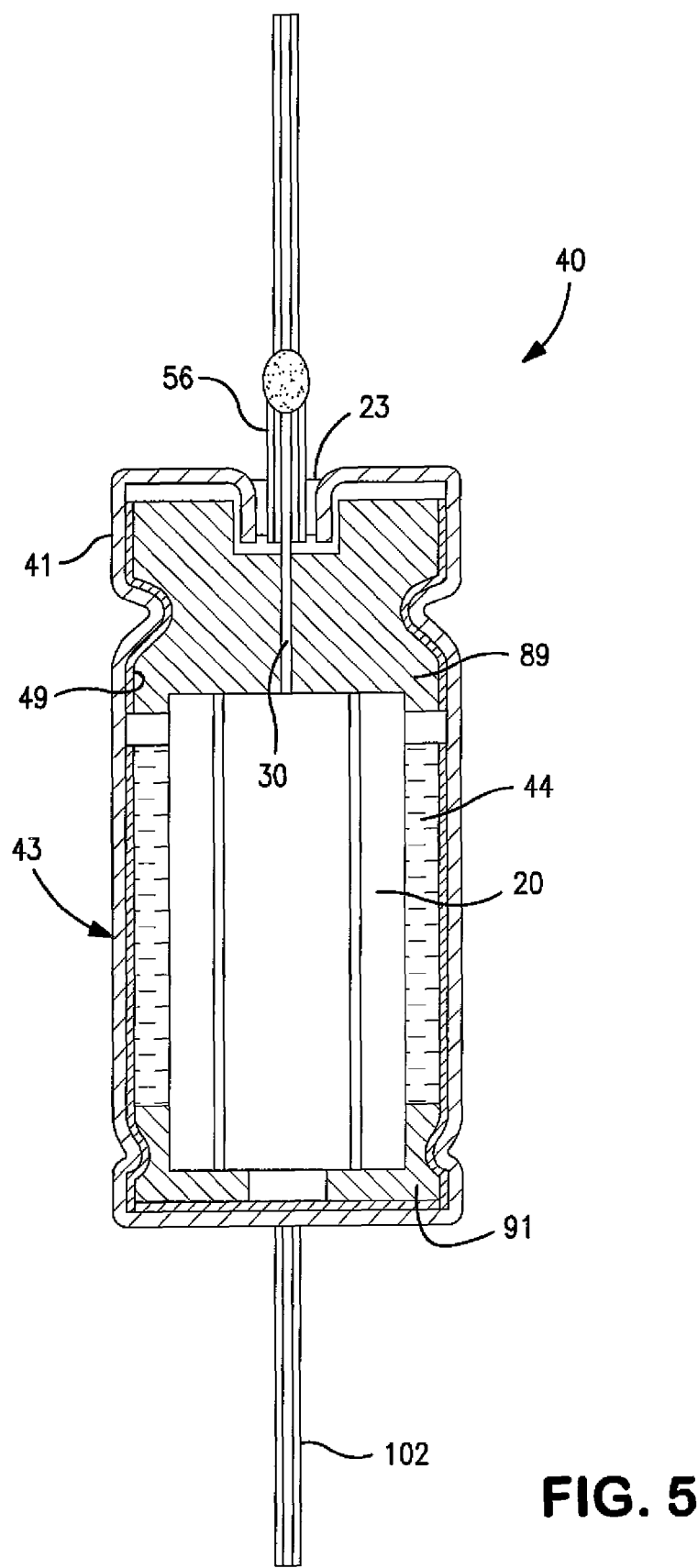
FIG. 5 is a cross-sectional view of one embodiment of the wet electrolytic capacitor of the present invention, which employs the anode shown in FIGS. 1-3.

The particular manner in which the components are incorporated into the capacitor is not critical and may be accomplished using a variety of techniques. Referring to FIG. 5, for example, one embodiment of an electrolytic capacitor 40 is shown that includes a working electrolyte 44 disposed in electrical contact with the anode 20 of FIGS. 1-3 and a cathode 43. The cathode 43 may generally be formed from a substrate 41 that is optionally coated with an electrochemically active material 49. In the illustrated embodiment, the substrate 41 forms a casing having a generally cylindrical shape. It should be understood, however, that any geometric configuration may be employed in the present invention, such as rectangular, triangular, prismatic, etc. The casing may optionally include a lid that covers the anode and electrolyte, which may be formed from the same or different material than the casing.

A liquid seal 23 (e.g., glass-to-metal) may also be employed that connects and seals the anode 20 to the cathode 43. An electrically insulating bushing 89 (e.g., polytetrafluoroethylene ("PTFE")) and/or support 91 may also be employed to help stabilize the anode 20 and lead 42 and maintain the desired spacing within the capacitor. If desired, a separator (not shown) may also be positioned between the cathode 43 and anode 20 to prevent direct contact between the anode and cathode, yet permit ionic current flow of the electrolyte 44 to the electrodes. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nation™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes. To optimize the volumetric efficiency of the capacitor, it is generally desired that the separator has a relatively small thickness. For example, the thickness of the separator, when employed, typically ranges from about 5 to about 250 micrometers, in some embodiments from about 10 to about 150 micrometers, and in some embodiments, from about 15 to about 100 micrometers.

The lid or casing may define an internal orifice through which extends a conductive tube 56 that is generally hollow and of a size and shape sufficient to accommodate an anode lead. The conductive tube 56 is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. During and/or after assembly and sealing (e.g., welding), the electrolyte may be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth.

The present invention may be better understood by reference to the following examples.

Test Procedures

Capacitance ("Cap")

The capacitance was measured via 'wet measurement' using a Keithley 3330 Precision LCZ meter with Kelvin Leads with 0 volt DC bias and a 1.0 volt peak to peak sinusoidal signal. The operating frequency was 120 Hz and the temperature was 23° C.±2° C. The capacitance was measured in 5M aqueous sulfuric acid electrolyte when one anode was set-up as anode and second anode was set-up as cathode. The measured value was multiplied by two to achieve the average capacitance of both anodes.

Ripple Current:

Ripple current was measured using a power supply GoldStar GP 505, generator of signal Metex, Thermocamera Nikon Thermal Vision and Osciloscope Fluke 80i at a temperature of 23° C.±2° C. The operating frequencies were 10 kHz and 30 kHz with AC signal and 0 volt DC bias when the appropriate value of ripple current was pass through the capacitor (0-4 A RMS). With increasing ripple current, the temperature also increased and was monitored via a thermocamera.

Example 1

6.32 grams of tantalum powder (Cabot, 18,000 µF*V/g) was initially pressed with a 0.5 mm thick tantalum lead wire and pressed on a top/bottom press machine (DORST Technologies TPA 15) to a density of 5.6 g/cm$^3$. The cylindrically-shaped anode was pressed with five symmetrical longitudinally extending channels recessed into the anode body. The binder (stearic acid) was then removed by following washing procedure—1 hour in 0.2% v/v sodium hydroxide at 85° C., 1 hour in deionized water at 85° C., 1 hour in 0.05% v/v nitric acid at 85° C. and finally 1 hour in deionized water at 85° C. The pellet was then sintered at a temperature of 1800° C. for 40 minutes in an argon atmosphere. To create tantalum pentoxide dielectric via anodic oxidation process, the pellet was then dipped into a weak phosphoric acid/water solution having a conductivity of 7900±100 mS/cm and temperature of 35±5° C., applied with a voltage of 80V and current not higher than 20 mA/g, and washed with deionized water. The anode was then assembled via standard route to get wet capacitor (i.e., 5M sulfuric acid electrolyte, tantalum can with tantalum sleeve as cathode).

Comparative Example 1

Capacitors were formed in the manner described in Example 1, except the powder weight (7.28 grams) and quantity of washing procedure (3×). The tantalum powder was also pressed with a full cylindrical shape (no channels). Multiple parts were made in all manner and then tested for ripple current. Tables 1 and 2 summarize the temperature outputs during ripple current measurements on the capacitors at 10 kHz or 30 kHz from Example 1 and compared with Comparative Example 1. The results are set forth below.

TABLE 1

| | Ripple Current [A] | | | | | | |
|---|---|---|---|---|---|---|---|
| | 0.0 | 1.0 | 2.5 | 2.0 | 3.5 | 3.0 | 4.0 |
| Example 1 @ 10 kHz | | | | | | | |
| temp [° C.] - capacitor 1 | 25.8 | 26.4 | 36.2 | 30.4 | 50.6 | 41.8 | 56.7 |
| temp [° C.] - capacitor 2 | 25.3 | 26.8 | 35.3 | 29.9 | 48.7 | 40.7 | 54.8 |
| temp [° C.] - capacitor 3 | 25.5 | 26.7 | 35.0 | 30.1 | 47.5 | 40.2 | 53.5 |
| temp [° C.] - capacitor 4 | 26.4 | 27.4 | 40.4 | 33.2 | 50.6 | 46.7 | 65.4 |
| temp [° C.] - capacitor 5 | 26.1 | 26.2 | 33.6 | 29.4 | 45.2 | 38.0 | 49.6 |
| Comp. Example 1 @ 10 kHz | | | | | | | |
| temp [° C.] - capacitor 1 | 26.1 | 26.2 | 38.2 | 32.8 | 50.6 | 46.1 | 64.5 |
| temp [° C.] - capacitor 2 | 25.5 | 26.5 | 38.0 | 32.7 | 50.6 | 45.9 | 63.8 |
| temp [° C.] - capacitor 3 | 25.8 | 26.2 | 36.5 | 31.4 | 50.6 | 43.5 | 59.6 |
| temp [° C.] - capacitor 4 | 26.5 | 27.4 | 43.6 | 36.8 | 50.6 | 50.6 | 76.6 |
| temp [° C.] - capacitor 5 | 25.9 | 26.1 | 34.6 | 30.7 | 47.7 | 41.4 | 56.3 |

TABLE 2

| | Ripple Current [A] | | | |
|---|---|---|---|---|
| | 0.0 | 1.5 | 2.5 | 3.5 |
| Example 1 @ 30 kHz | | | | |
| temp [° C.] - capacitor 1 | 26.8 | 26.4 | 29.1 | 35.5 |
| temp [° C.] - capacitor 2 | 26.1 | 26.2 | 28.7 | 35.4 |
| temp [° C.] - capacitor 3 | 26.1 | 26.1 | 28.1 | 34.1 |
| temp [° C.] - capacitor 4 | 27.1 | 27.7 | 31.5 | 42.0 |
| temp [° C.] - capacitor 5 | 26.8 | 26.8 | 29.0 | 35.1 |
| Comp. Example 1 @ 30 kHz | | | | |
| temp [° C.] - capacitor 1 | 25.8 | 27.4 | 31.3 | 40.0 |
| temp [° C.] - capacitor 2 | 25.5 | 27.3 | 30.4 | 38.7 |
| temp [° C.] - capacitor 3 | 25.5 | 27.8 | 30.5 | 38.3 |
| temp [° C.] - capacitor 4 | 25.9 | 29.7 | 35.1 | 46.8 |
| temp [° C.] - capacitor 5 | 25.5 | 26.8 | 30.1 | 36.5 |

As indicated, Example 1 showed improvement in life ripple current testing, mainly at a higher current (it is shown on 4 A at 10 kHz and 3.5 A at 30 kHz mainly), which illustrates better current transport in capacitor via improved shape of anode.

Example 2

6.47 grams of tantalum powder (H.C. Starck, 100,000 μF*V/g) was initially pressed with a 0.5 mm thick tantalum lead wire and pressed on a top/bottom press machine (DORST Technologies TPA 15) to a density of 6.4 g/cm³. The cylindrically-shaped anode was pressed with five (5) symmetrical longitudinally extending channels recessed into the anode body. The binder (stearic acid) was then removed by following washing procedure—1 hour in 0.2% v/v sodium hydroxide at 85° C., 1 hour in deionized water at 85° C., 1 hour in 0.05% v/v nitric acid at 85° C. and finally 1 hour in deionized water at 85° C. The pellet was then sintered at a temperature of 1220° C. for 10 minutes in an argon atmosphere. To create tantalum pentoxide dielectric via anodic oxidation process, the pellet was then dipped into a weak phosphoric acid/water solution having a conductivity of 7900±100 mS/cm and temperature of 35±5° C., applied with a voltage of 15V and current not higher than 20 mA/g, and washed with deionized water.

Comparative Example 2

Capacitors were formed in the manner described in Example 2, except the powder weight (7.37 grams) and quantity of washing procedure (3×). The tantalum powder was also pressed with a full cylindrical shape (no channels). Multiple parts (10) were made in all manner and then tested for capacitance measurement.

Example 3

6.43 grams of tantalum powder (H.C. Starck, 150,000 μF*V/g) was initially pressed with a 0.5 mm thick tantalum lead wire and pressed on a top/bottom press machine (DORST Technologies TPA 15) to a density of 6.4 g/cm³. The cylindrical shape anode was pressed with five symmetrical longitudinally extending channel which was recessed into the anode body. The stearic acid binder was then removed by following washing procedure—1 hour in 0.2% v/v sodium hydroxide at 85° C., 1 hour in deionized water at 85° C., 1 hour in 0.05% v/v nitric acid at 85° C. and finally 1 hour in deionized water at 85° C. The pellet was then sintered at a temperature of 1270° C. for 10 minutes in an argon atmosphere. To create tantalum pentoxide dielectric via anodic oxidation process, the pellet was then dipped into a weak phosphoric acid/water solution having a conductivity of 7900±100 mS/cm and temperature of 35±5° C., applied with a voltage of 15V and current not higher than 20 mA/g, and washed with deionized water.

Comparative Example 3

Capacitors were formed in the manner described in Example 2, except the powder weight (7.33 grams) and quantity of washing procedure (3×). The tantalum powder was pressed with a full cylindrical shape (no channels). Multiple parts (10) were made in all manner and then tested for capacitance measurement.

Example 4

6.52 grams of tantalum powder (H.C. Starck, 200,000 μF*V/g) was initially pressed with a 0.5 mm thick tantalum lead wire and pressed on a top/bottom press machine (DORST Technologies TPA 15) to a density of 6.4 g/cm³. The cylindrically-shaped anode was pressed with five (5) symmetrical longitudinally extending channels recessed into the anode body. The binder (stearic acid) was then removed by following washing procedure—1 hour in 0.2% v/v sodium hydroxide at 85° C., 1 hour in deionized water at 85° C., 1 hour in 0.05% v/v nitric acid at 85° C. and finally 1 hour in deionized water at 85° C. The pellet was then sintered at a temperature of 1100° C. for 100 minutes in an argon atmosphere. To create tantalum pentoxide dielectric via anodic oxidation process, the pellet was then dipped into a weak phosphoric acid/water solution having a conductivity of 7900±100 mS/cm and temperature of 35±5° C., applied with a voltage of 15V and current not higher than 20 mA/g, and washed with deionized water.

Comparative Example 4

Capacitors were formed in the manner described in Example 2, except the powder weight (7.42 grams) and quantity of washing procedure (3×). The tantalum, powder was pressed with a full cylindrical shape (no channels). Multiple parts (10) were made in all manner and then tested for capacitance measurement in 5M sulfuric acid.

Tables 3 and 4 summarizes the capacitance efficiencies from median of capacitance based on measurements of Examples 2-4 and compared with Comparative Example 2-4. The results are set forth below.

TABLE 3

|  | Anode CAP [mF] | Anode weight [g] | CAP/g | CAP efficiency [(CAP/g Ex * 100/CAP/g Comp Ex) %] |
| --- | --- | --- | --- | --- |
| Example 2 | 27.78 | 6.43 | 4.32 | — |
| Comp. Example 2 | 26.48 | 7.33 | 3.61 | 83.7 |
| Example 3 | 32.94 | 6.47 | 5.09 | — |
| Comp. Example 3 | 30.82 | 7.37 | 4.18 | 82.1 |
| Example 4 | 38.34 | 6.52 | 5.88 | — |
| Comp. Example 4 | 33.96 | 7.42 | 4.57 | 77.7 |

TABLE 4

|  | CV/g [mFV/g] | CV/cc [mFV/cc] | Anode CAP [mF] | CV/cc [mFV/cc] measured | Volumetric efficiency [(CV/cc measured * 100/CV/cc) %] | CAP efficiency [(Vol eff Ex − Vol eff Comp Ex) %] |
| --- | --- | --- | --- | --- | --- | --- |
| Example 2 | 100 | 640 | 27.78 | 416.7 | 65.1 |  |
| Comp. Example 2 | 100 | 640 | 26.48 | 397.2 | 62.1 | 3.0 |
| Example 3 | 150 | 960 | 32.94 | 494.1 | 51.5 |  |
| Comp. Example 3 | 150 | 960 | 30.82 | 462.3 | 48.2 | 3.3 |
| Example 4 | 200 | 1280 | 38.34 | 575.1 | 44.9 |  |
| Comp. Example 4 | 200 | 1280 | 33.96 | 509.4 | 39.8 | 5.1 |

As indicated in Table 3, Examples 2-4 showed improvement in capacitance efficiency (about 20%) in comparison with Comparative Examples 2-4. Further, Table 4 shows slight improvements in volumetric efficiency between Examples 2-4 and Comparative Examples 2-4 despite of the fact that more than 12% of powder is saved for the same volume (and also case size).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode containing a sintered porous anode body that extends in a longitudinal direction and is coated with a dielectric, wherein the anode body contains a sidewall positioned between a proximal end and an opposing distal end, wherein a longitudinally extending channel is recessed into the sidewall, wherein the channel has an aspect ratio of from about 10 to about 200;
   a fluid electrolyte; and
   a cathode that contains a substrate.

2. The wet electrolytic capacitor of claim 1, wherein the porous anode body is formed from a powder that contains tantalum, niobium, or an electrically conductive oxide thereof.

3. The wet electrolytic capacitor of claim 2, wherein the powder has a specific charge of from about 20,000 to about 450,000 μF*V/g.

4. The wet electrolytic capacitor of claim 1, wherein the anode body has a length in the longitudinal direction and a width and depth, and wherein the ratio of the length to both the width and depth is from about 1.1 to about 10.

5. The wet electrolytic capacitor of claim 1, wherein the longitudinally extending channel intersects both the distal end and the proximal end.

6. The wet electrolytic capacitor of claim 1, wherein an anode lead extends from the proximal end of the anode in the longitudinal direction.

7. The wet electrolytic capacitor of claim 1, wherein the anode body has a generally cylindrical shape.

8. The wet electrolytic capacitor of claim 1, wherein the channel has an aspect ratio of from about 15 to about 150.

9. The wet electrolytic capacitor of claim 1, wherein the channel has a length of from about 1 to about 60 millimeters and a width of from about 0.02 to about 15 millimeters.

10. The wet electrolytic capacitor of claim 1, wherein the channel has a substantially constant width.

11. The wet electrolytic capacitor of claim 1, wherein the channel has a depth that is from about 5% to about 50% of the thickness of the porous anode body.

12. The wet electrolytic capacitor of claim 1, wherein a plurality of longitudinally extending channels are recessed into the sidewall of the anode body.

13. The wet electrolytic capacitor of claim 12, wherein from 4 to 10 channels are recessed into the anode body.

14. The wet electrolytic capacitor of claim 12, wherein the channels are distributed in a generally symmetrical manner about a longitudinal center of the anode body.

15. The wet electrolytic capacitor of claim 12, wherein the anode body contains first and second longitudinally extending channels, the first channels being recessed into the sidewall to a different depth than the second channels.

16. The wet electrolytic capacitor of claim 15, wherein the first channels have a depth that is from about 25% to about 45% of the thickness of the anode body, and the second channels have a depth that is from about 10% to about 25% of the thickness of the anode body.

17. The wet electrolytic capacitor of claim 1, wherein the channel is substantially parallel to the longitudinal direction.

18. The wet electrolytic capacitor of claim 1, further comprising an electrochemically active material that is disposed on a surface of the substrate.

19. The wet electrolytic capacitor of claim 18, wherein the electrochemically active material contains a conductive polymer.

20. The wet electrolytic capacitor of claim 1, wherein the substrate comprises titanium, tantalum, or a combination thereof.

21. The wet electrolytic capacitor of claim 1, wherein the fluid electrolyte is aqueous.

22. The wet electrolytic capacitor of claim 1, wherein the fluid electrolyte has a pH of from about 4.5 to about 7.0.

23. The wet electrolytic capacitor of claim 1, wherein the substrate is in the form of a casing within which the anode and the fluid electrolyte are positioned.

24. The wet electrolytic capacitor of claim 1, wherein the capacitor exhibits a volumetric efficiency of from about 20,000 to about 95,000 $\mu F*V/cm^3$.

25. The wet electrolytic capacitor of claim 1, wherein the maximum ripple current is about 2.5 Amps or more.

26. The wet electrolytic capacitor of claim 1, wherein the anode contains about 50 ppm carbon or less.

27. A wet electrolytic capacitor comprising:
an anode containing a generally cylindrical, sintered porous anode body having a sidewall positioned between a proximal end and an opposing distal end, the anode body being coated with a dielectric, wherein a plurality of longitudinally extending channels are recessed into the sidewall of the anode body, wherein the channels have an aspect ratio of from about 10 to about 200, the anode body containing tantalum, niobium, or an electrically conductive oxide thereof, wherein the anode further comprises an anode lead wire that extends from the proximal end of the anode in the longitudinal direction;
an aqueous fluid electrolyte; and
a generally cylindrical metal casing within which the anode and the fluid electrolyte are positioned, wherein an electrochemically active material is disposed on an interior surface of the casing.

28. The wet electrolytic capacitor of claim 27, wherein the channels have an aspect ratio of from about 15 to about 150.

29. The wet electrolytic capacitor of claim 27, wherein the channels have a substantially constant width.

30. The wet electrolytic capacitor of claim 27, wherein the channels are distributed in a generally symmetrical manner about a longitudinal center of the anode body.

31. The wet electrolytic capacitor of claim 27, wherein the anode body contains first and second longitudinally extending channels, the first channels being recessed into the sidewall of the anode body to a different depth than the second channels.

32. A method for forming a wet electrolytic capacitor, the method comprising:
pressing a powder into a porous anode body that extends in a longitudinal direction, wherein a longitudinally extending channel is recessed into the anode body, wherein the channel has an aspect ratio of from about 10 to about 200;
sintering the porous anode body;
anodically oxidizing the sintered; anode body to form an anode; and
placing the anode into electrical communication with a cathode and a fluid electrolyte.

\* \* \* \* \*